(12) United States Patent  
Rogers (10) Patent No.: US 7,505,119 B2  
(45) Date of Patent: *Mar. 17, 2009

(54) MULTI-FUNCTION OPTICAL SYSTEM AND ASSEMBLY

(75) Inventor: Philip L Rogers, Manassas, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/257,289

(22) PCT Filed: Apr. 13, 2001

(86) PCT No.: PCT/US01/12025

§ 371 (c)(1),  
(2), (4) Date: Oct. 11, 2002

(87) PCT Pub. No.: WO01/90691

PCT Pub. Date: Nov. 29, 2001

(65) Prior Publication Data

US 2003/0133092 A1    Jul. 17, 2003

(51) Int. Cl.  
*G01C 3/06* (2006.01)  
*F41G 3/26* (2006.01)

(52) U.S. Cl. ............................ 356/4.01; 434/22; 434/27

(58) Field of Classification Search ................ 356/4.01; 434/21, 22, 27; 463/51; 359/341.1  
See application file for complete search history.

(56) References Cited

U.S. PATENT DOCUMENTS

| | | | |
|---|---|---|---|
| 3,633,285 A | 1/1972 | Sensney | |
| 3,898,747 A * | 8/1975 | Marshall | 434/22 |
| 4,561,849 A | 12/1985 | Eichweber | |
| 4,713,544 A | 12/1987 | Grage | |
| 4,825,091 A | 4/1989 | Breyer et al. | |
| 4,959,016 A | 9/1990 | Lawrence | |
| 5,276,543 A * | 1/1994 | Olshansky | 398/79 |
| 5,301,054 A * | 4/1994 | Huber et al. | 398/66 |
| 5,636,992 A | 6/1997 | Mastrangelo | |
| 5,788,500 A | 8/1998 | Gerber | |
| 5,864,413 A * | 1/1999 | Feldman et al. | 398/72 |
| 5,926,260 A | 7/1999 | Dunne et al. | |
| 6,193,157 B1 * | 2/2001 | Dickson et al. | 235/462.01 |
| 6,288,381 B1 * | 9/2001 | Messina | 250/201.1 |
| 6,289,031 B1 * | 9/2001 | Stultz et al. | 372/92 |

\* cited by examiner

*Primary Examiner*—Isam Alsomiri  
(74) *Attorney, Agent, or Firm*—Clark & Brody (57) ABSTRACT

An optical system or assembly is formed of a plurality of optical sources (10, 12, 14) and components of different laser-based equipment systems. The sources and/or components may be combined and/or eliminated to reduce complexity, cost and/or overall weight of the system by consolidating multiple laser sources into a reduced number of sources, and by multiplexing (19) different wavelength signals over common carriers. A laser engagement system (12, 14) and an infrared aim light (10) (or infrared illuminator) are powered by a single laser source which is adopted for use with conventional equipment by lengthening the duration of the coded pulses emitted by the transmitter. The transmitter may be triggered in response to the heat and/or pressure generated by the blank upon firing. A visible bore light may be eliminated by connecting infrared and/or visible aim light (10) directly to a rifle barrel. The laser engagement system and the infrared aim light (or infrared illuminator) are provided in a common housing assembly (410).

14 Claims, 6 Drawing Sheets

MULTI-FUNCTION OPTICAL SYSTEM AND ASSEMBLY

FIELD OF THE INVENTION

The present invention relates generally to optics and optical systems and devices. The present invention also relates to a method of operating a multi-function optical system. The present invention also relates to an assembly for a multi-function optical system.

BACKGROUND OF THE INVENTION

Multi-function laser-based systems are employed for a variety of purposes. For example, it has been suggested to provide up to seven different laser-based equipment systems in combination, including the following: (1) a laser range finder; (2) an infrared aim light; (3) an infrared illuminator (a flashlight); (4) a visible aim light; (5) a visible bore light (a mandrel boresight laser for aligning sights); (6) a combat identification system; and (7) a multiple integrated laser engagement system for laser-tag simulated exercises, referred to herein as a "laser simulation system."

Prior art multi-function laser-based systems are generally complex and bulky. There is a need in the art for a system in which components are combined and/or eliminated to reduce complexity, cost and overall weight. In particular, there is a need for an optical system which provides multiple functions with a reduced number of optical sources and/or other components. Additionally, there is a need for an uncomplicated method of operating a multi-function optical system. Additionally, there is a need for an assembly for a multi-function optical system.

SUMMARY OF THE INVENTION

The disadvantages of the prior art are overcome to a great extent by the present invention. Although the invention is illustrated in the drawings in connection with known functions, the invention is considered applicable to a number of other uses as well. In general, the invention may be applicable wherever complexity, cost and/or weight can be reduced by combining the functionality of optical sources and/or other components.

According to one aspect of the invention, a plurality of optical sources and components of different laser-based equipment systems are combined and/or eliminated to reduce complexity, cost and/or overall weight. This aspect may be accomplished by consolidating multiple laser sources into a reduced number of sources, and by multiplexing different wavelength signals over common carriers, and there are other aspects of the invention.

According to another aspect of the invention, a laser simulation system and an infrared aim light (or infrared illuminator) are powered by a single laser source. According to this aspect of the invention, a single laser source can be adopted for the laser simulation system by lengthening the duration of the coded pulses emitted by the laser simulation system transmitter. The shorter wavelength pulses are attenuated to a greater degree by the filter cap on the laser simulation system receiver. Thus, by lengthening the pulses, the laser simulation system receiver is actuated by the pulses in the same way as if they were conventional pulses. The laser simulation system receiver may optionally be located on the person who is being targeted.

According to another aspect of the invention, the laser simulation system transmitter is triggered in response to the heat and/or pressure generated by blank ammunition gasses upon firing. This provides a way to ensure that the transmitter is only initiated when someone actually pulls the trigger on the laser simulation system.

According to another aspect of the invention, the visible bore light (item (5) mentioned above) may be eliminated by connecting the infrared and/or visible aim light directly to the rifle barrel.

According to another aspect of the invention, a multifunction lens system is provided which integrates multiple lenses for outputting several different functions. The lens system may be formed of first and second lenses fixedly connected to each other, or one formed on a portion of the other, with each lens providing various functional outputs. Optionally, the first lens can be a collimating lens.

According to yet another aspect of the invention, a method of fabricating an optical system comprised of a plurality of optical sources and components of different laser-based equipment systems is provided. Laser sources operated at different wavelengths are wavelength division multiplexed (WDM) through various optical transmission lines to power six or more different functional outputs.

The present invention also relates to an enclosure for enclosing an optical output device, laser sources and other optical and/or electrical components. The enclosure may be mounted on an aimable device, such as a rifle or binoculars.

These and other advantages and features of the invention will become apparent from the following detailed description of the invention which is provided in conjunction with the accompanying drawings.

DETAILED DESCRIPTION OF PREFERRED EMBODIMENTS

Figure 1:
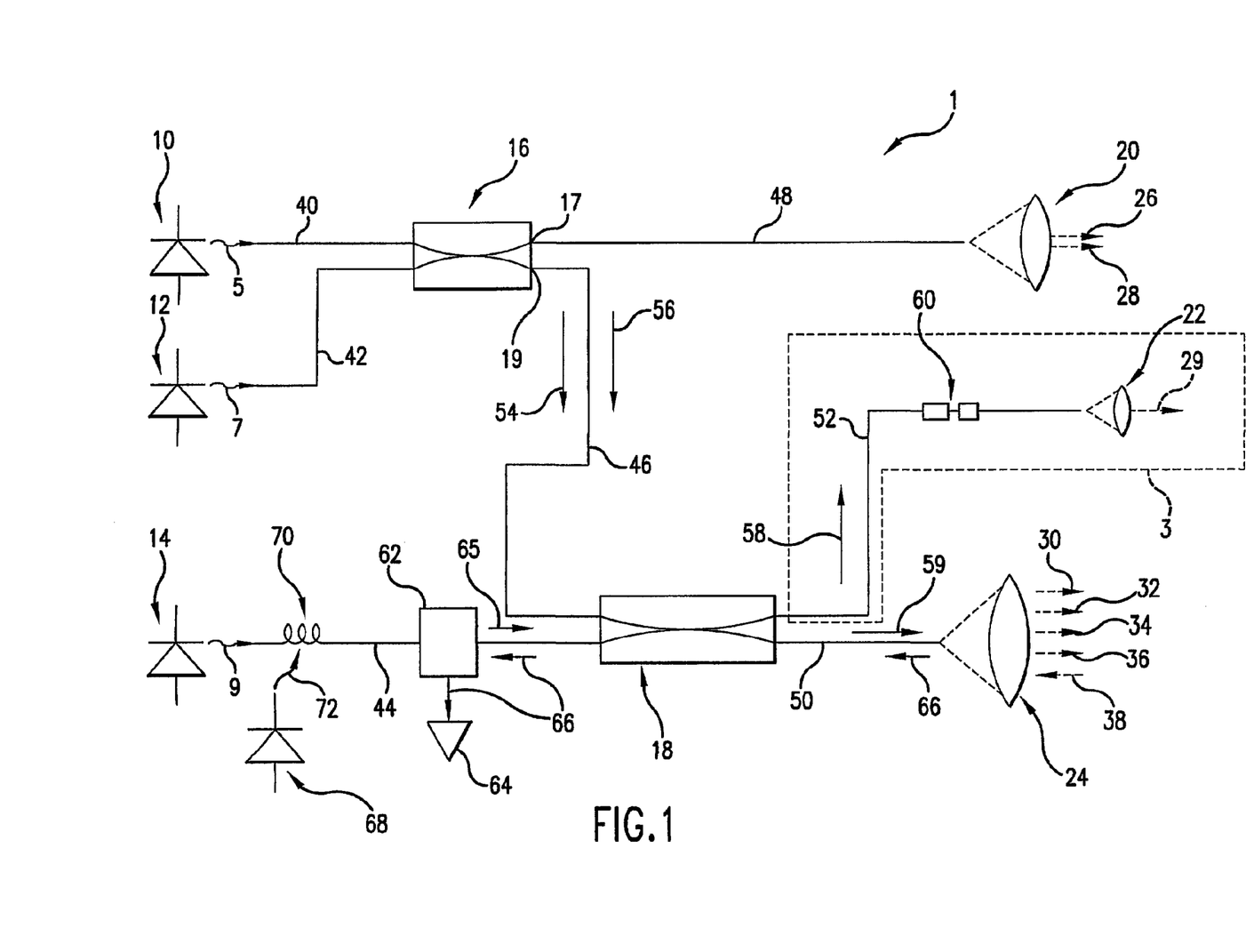
FIG. 1 is a schematic view of an optical system constructed in accordance with a preferred embodiment of the invention.

Referring now to the drawings, where like reference numerals designate like elements, there is shown in FIG. 1 an optical system 1 constructed in accordance with a preferred embodiment of the invention. The illustrated system 1 has a first source 10 for generating a first input laser energy 5. The first input energy 5 may have a wavelength in the near infrared spectrum (the infrared spectrum near the visible spectrum), for example from about 820 nanometers (nm) to about 860 nm, preferably about 825 nm.

The first input energy 5 propagates through an optical transmission line 40 and is launched into an optical coupler or splitter 16. The coupler 16 distributes optical power among two or more ports 17, 19. The coupler 16 directs a first portion of the input energy 5 into transmission line 48 and a second portion of the input energy 5 into transmission line 46 (in direction 56). The split of the first portion and the second portion will depend upon the requirements of the system. For example, the split may be 60% to 40%, 80% to 20%, 100% to 0%, or other split. The input energy 5 propagating in transmission line 48 enters a lens 20 and is output from the lens 20 as an infrared illuminating light.

The input energy 5 propagating through transmission line 46 enters a multiplexer 18. The input energy 5 is transmitted through the multiplexer 18 and is launched into transmission line 50 (in direction 59) to enter a second lens 24. Light energy 5 output from the second lens 24 may be used in a laser training simulation system. A conventional laser simulation system source operates at 904 nanometers. Thus, according to the illustrated embodiment, the 825 to 860 nanometers source 10 is adopted for the laser simulation system by lengthening the duration of the coded pulses 30. The shorter wavelength pulses (825 nm to 860 nm, which are shorter than the conventional 904 nm) are attenuated to a greater degree by the filter cap (not shown) on the known laser simulation system receiver (not shown). Thus, the laser simulation system receiver is actuated by the 825 to 860 nm pulses in the same way as if they were 904 nm pulses. The laser simulation system receiver may be located on the person (not shown) who is targeted by the laser simulation system transmitter 24.

In a known laser simulation system, the user pulls a trigger to fire a blank cartridge to simulate the firing of an actual round and, in response, a sensor on the laser simulation system transmitter triggers the laser. The player identification and transmitter type can be encoded on the laser beam using a laser simulation system code. An electronic controller is connected through an amplifier to the optical detectors to decode the output signals thereof and provide an indication that the person carrying the receiver has been hit by the laser.

It is possible, however, for a user to simulate the firing of a blank cartridge without actually firing a blank by manipulating the rifle to "re-coil" such that the laser simulation system transmitter is operated. Thus, the laser shot from that transmitter can go unrecognized, giving the user an unfair advantage. To overcome these problems, the present invention provides a laser simulation system transmitter 10, 24, 30 that is triggered in response to the heat and/or pressure generated by the blank ammunition gasses upon firing. This provides a way to ensure that the transmitter 10, 24, 30 is only initiated when the user actually pulls the trigger (not shown).

Further, the optical system 1 has a second driver or source 12 for providing a second input energy 7. The second input energy 7 may be laser light with a wavelength in the visible spectrum (e.g., about 630 nm to about 650 nm, preferably about 635 nm). The second input energy 7 propagates through optical transmission line 42 into the coupler 16. The coupler 16 directs about 100% of the input energy 7 into transmission line 46 in direction 54. The input energy 7 propagating through transmission line 46 enters the multiplexer 18. The multiplexer 18 directs the input energy 7 into transmission line 50 in direction 59 to enter the second lens 24. The input energy 7 output from the second lens 24 may be used as a visible aiming light 32.

In addition, a third driver or source 14 may be used to provide a third input energy 9 having a wavelength of about 1530 nm to about 1555 nm, preferably about 1538 nm. In a preferred embodiment, the third input energy 9 is amplified by an erbium-doped fiber amplifier 70 for further propagation in transmission line 44.

The third input energy 9 traveling along optical transmission line 44 enters circulator 62 which acts as a passive waveguide junction between the multiplexer 18 and a photodetector 64. The third input energy 9 transmitted out of the circulator 62 in direction 65 enters the multiplexer 18. The multiplexer 18 inputs the third input energy 9 into transmission line 50 in direction 59. Thus, the input energy 9 exits the second lens 24 as fifth output light 34, which may be used, for example as a combat identification transmission.

Additionally, the input energy 9 exiting the lens 24 may form a light 36 for a laser rangefinder system. According to this aspect of the invention, the output light 36 is returned back to the lens 24 as returned light 38, which may be used to determine target position, target coordinates and the like. The returned light 38 is propagated back through optical communication line 50 in direction 66 to the multiplexer 18 and from there through the circulator 62 and into a photodetector 64. The photodetector 64 may be a processor-based system which can receive the returned light 38 and integrate and process the information contained therein.

If desired, the optical system 1 also may be provided with a visible borelight assembly 3. In the borelight assembly 3, input energy 7 travels in direction 58 along optical transmission line 52. The input energy 7 enters an additional lens 22 and exits as optional output light 29. In an alternative embodiment of the invention, the entire borelight assembly 3 may be eliminated by connecting the first output light 26 (infrared aim light) and/or the fifth output light 34 (visible aim light) directly to the rifle barrel (not illustrated).

Figure 2:
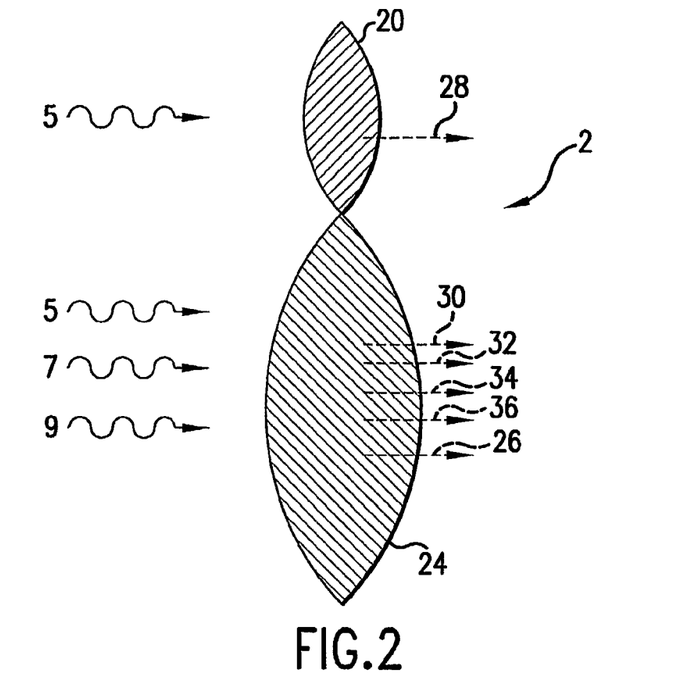
FIG. 2 is a cross sectional view of a lens device constructed in accordance with a preferred embodiment of the invention.

FIG. 2 shows a lens device 2 constructed in accordance with a preferred embodiment of the invention. Lens device 2 comprises the first lens 20 and the second lens 24 fixedly connected to each other. The first input energy 5 enters the first lens 20 and exits as an output light 26. As discussed above, the output light 26 may be used for infrared illumination.

Additionally, first input energy 5 can enter second lens 24 and exit as third output light 30, to be used in an otherwise conventional laser simulation system. The second input energy 7 enters second lens 24 and exits as fourth output light 32. The fourth output light may be used as a visible aiming light. The third input energy 9 enters second lens 24 and exits as fifth output light 34 or sixth output light 36. Preferably, the fifth output light 34 is used for combat identification transmission and the sixth output light 36 is used in a rangefinder system.

Thus, the optical system 1 has multiple functions and integrates multiple lenses for outputting light beams for several different purposes. The lens system can optionally comprise a first lens and a second lens fixedly connected to each other, with each lens providing various functional outputs.

Figure 3:
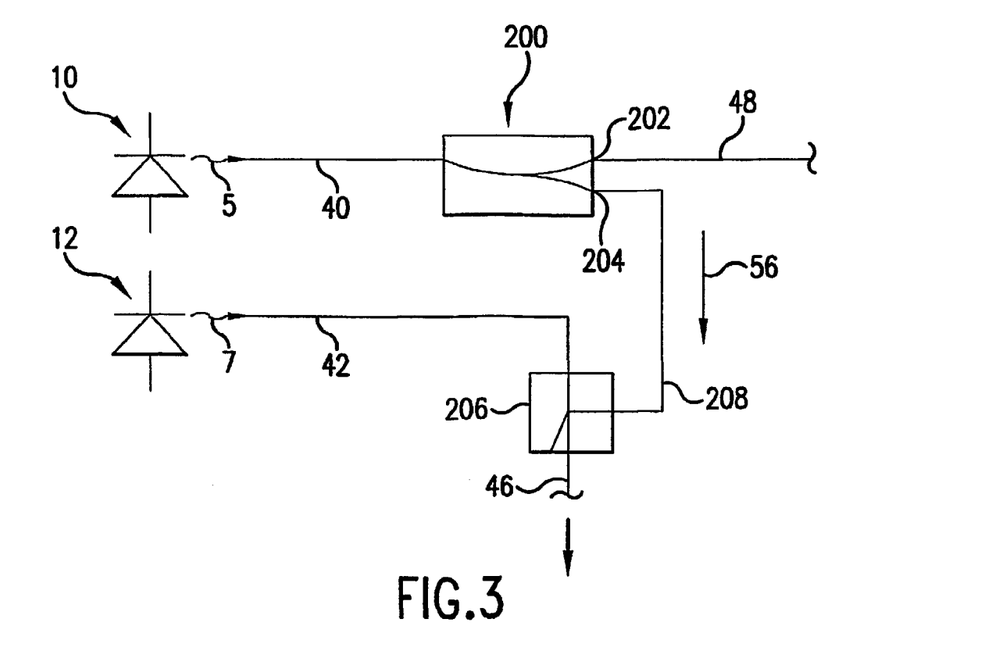
FIG. 3 is a partial schematic view of another optical system constructed in accordance with another preferred embodiment of the invention.

Referring now to FIG. 3, there is shown an alternative optical power supply system in which the first input energy 5 propagates through an optical transmission line 40 and is launched into an optical splitter 200. The splitter 200 distributes the signal 5 into two or more ports 202, 204. 40% of the power 5 may be propagated into an optical transmission line 48. 60% of the power is distributed into a second line 208. The percentages of the power distributed through the two lines 48, 208 may be changed as desired. The signal 7 from the second source 12 is transmitted through optical line 42 and is coupled with the power in the line 208 by a coupler 206. The coupler 206 outputs a desired portion of the two signals 5, 7 into an output line 46. The output line 46 is connected to the multiplexer 18 as discussed above.

Figure 4:
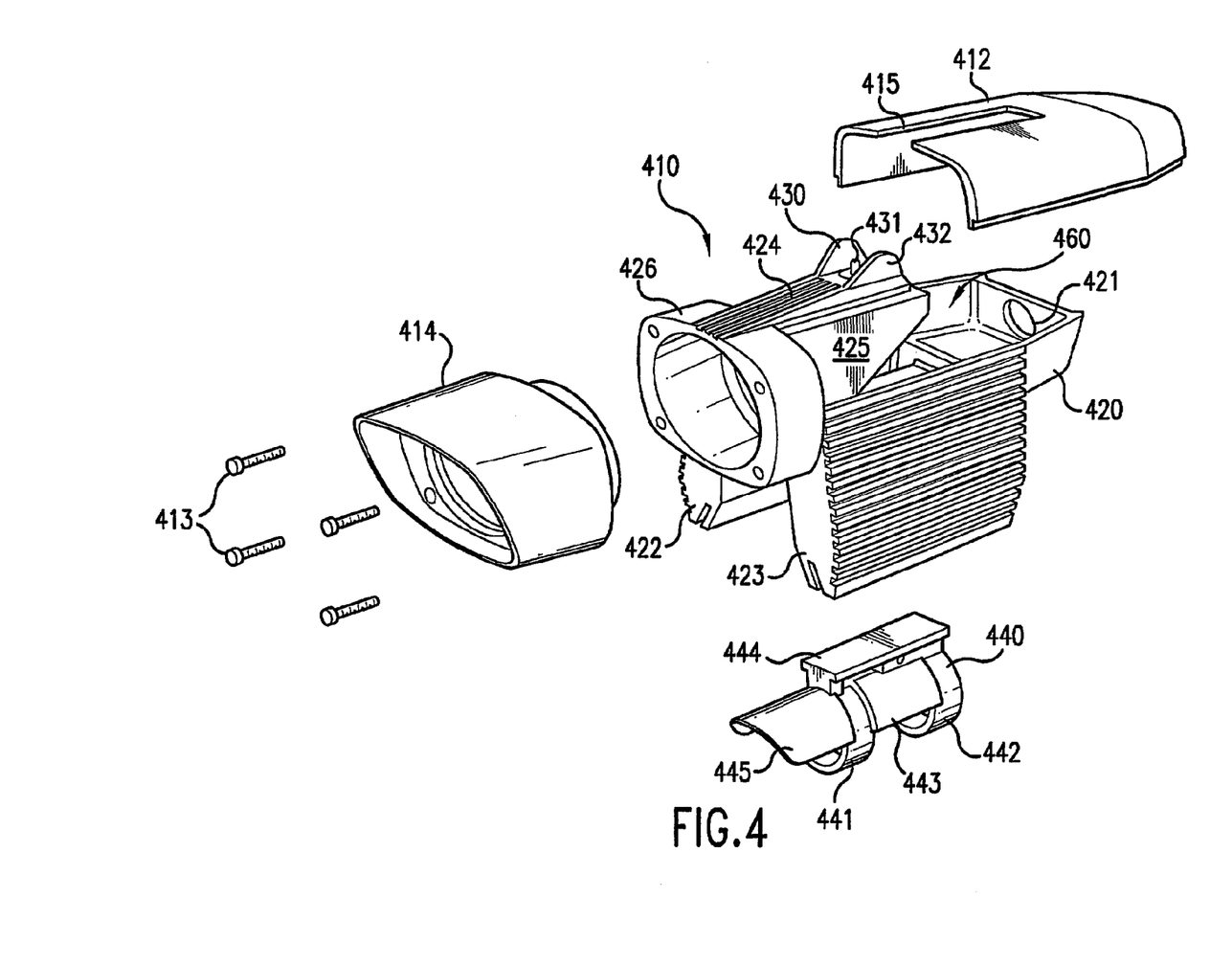
FIG. 4 is an exploded view of an optical assembly constructed in accordance with one embodiment of the present invention.
Figure 6:
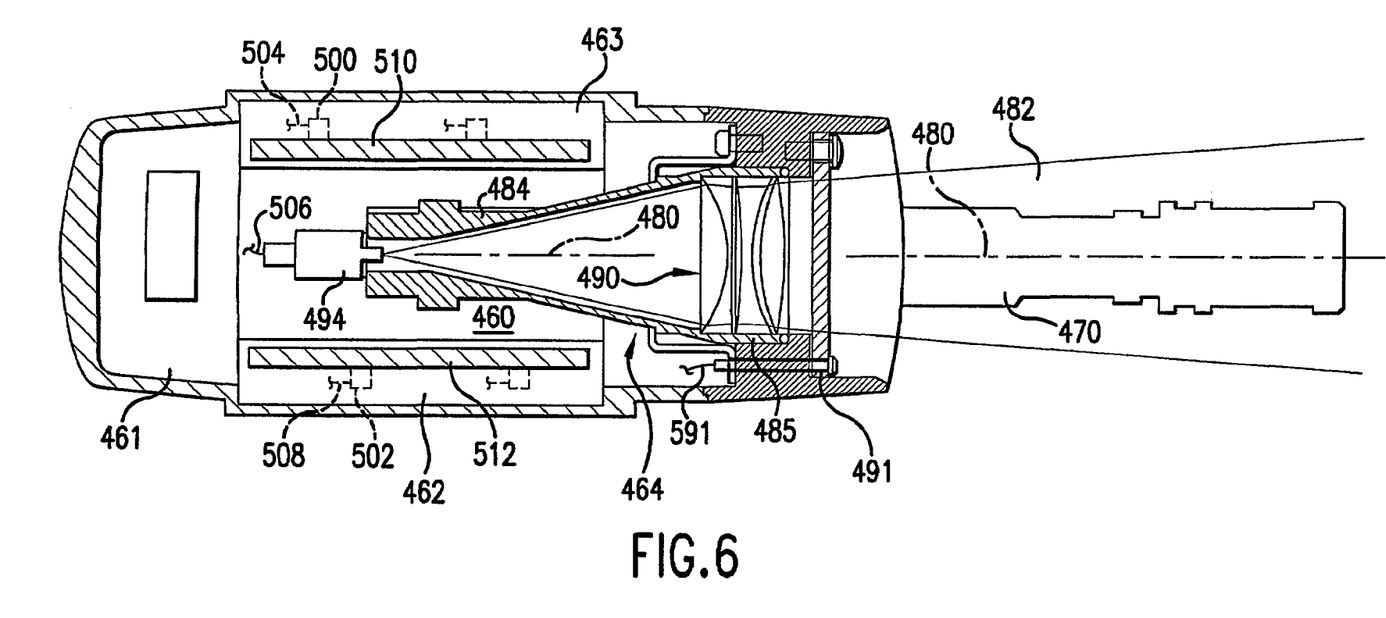
FIG. 6 is a cross sectional view of the optical assembly of FIG. 4.

FIG. 4 shows a multi-laser apparatus 410 constructed in accordance with another preferred embodiment of the invention. The illustrated apparatus 410 has a cover 412, a body 420, a hood 414, and a sight block 440. The block 440 is located on a rifle barrel 470 as described in more detail below. The rifle barrel 470 is shown in FIG. 6. The body 420 is mounted on the rail 444 of the sight block 440 by suitable fasteners. The hood 414 is mounted on the forward end of the body 420 by bolts 413 or the like. The cover 412 is removably located on top of the body 420 to enclose various electronic and optical components as discussed in more detail below.

The sight block 440 has first and second clamps 441, 442 that are mounted around the rifle barrel 470. Insulating layers or devices may be located within the clamps 441, 442 to protect the components within the body 420 from high temperatures generated within the rifle, if desired. The present invention should not be limited, however, to the preferred embodiments shown and described in detail herein. A block rail 444 is integrally connected to the clamps 441, 442. The body 420 is supported on the block rail 444. The term "sight block" takes its name herein from its position on the rifle where a rifle sight is otherwise conventionally located. If desired, one or more gun sights 430, 431 may be located on the top of the body 420, as described in more detail below. The sight block 440 may also have a middle portion 443 integrally connected to the clamps 441, 442 to provide a single unitary device. A front portion or hood 445 is located at the front part of the sight block 440. The middle portion 443 and the hood 445 may have curved inner surfaces (hidden from view in FIG. 4) to conform to the upper surface of the rifle barrel 470.

Figure 7:
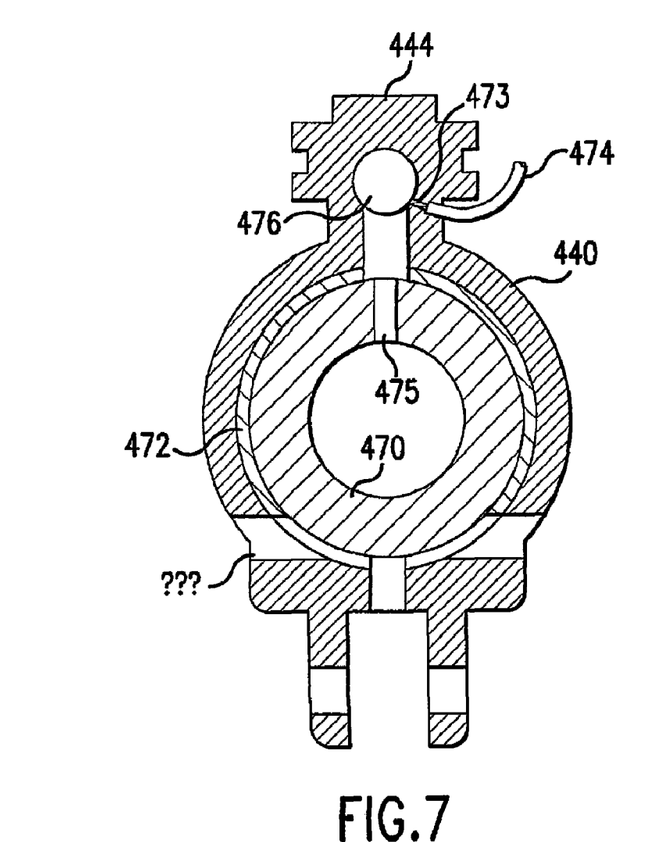
FIG. 7 is a cross sectional view of a sight block for the assembly of FIGS. 4-6.
Figure 8:
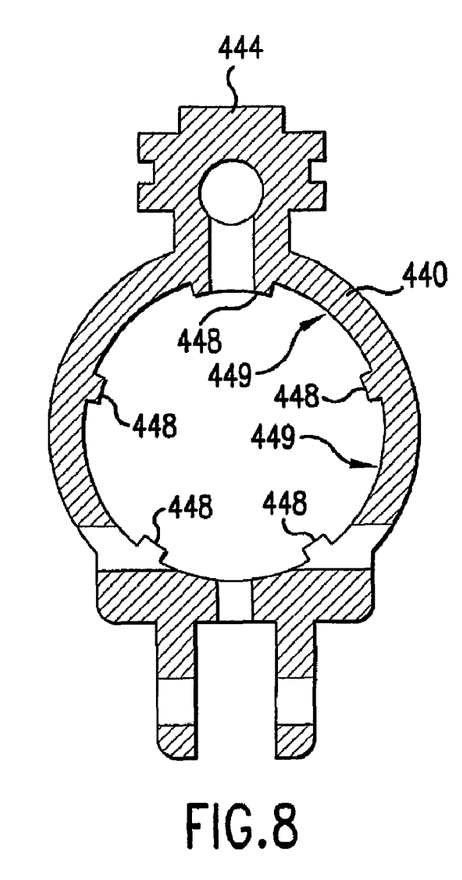
FIG. 8 is a cross sectional view of another embodiment of a sight block according to the present invention.

The insulating layers 472 on the inside of the clamps 441, 442 are shown in FIG. 7. The insulation may be formed of a suitable material, for example a ceramic insulating material, such as zirconia coated on the inner surfaces of the clamps 441, 442, if desired. The insulation 472 is positioned against the surface of the rifle barrel 470 in the assembled position. The present invention should not be limited, however, to the illustrated arrangement. In an alternative embodiment of the invention shown in FIG. 8, heat insulation is provided by spacer lugs 448 located on the inside of the clamps 441, 442. The lugs 448 provide air spaces 449 between the rifle barrel 470 and the clamps 441, 442 which provide the desired heat insulation.

In a known laser simulation system, the user pulls a trigger to fire a blank cartridge to simulate the firing of an actual round and, in response, a sensor on the laser simulation system transmitter triggers the laser. The player identification and transmitter type can be encoded on the laser beam using a laser simulation system code. An electronic controller is connected through an amplifier to the optical detectors to decode the output signals thereof and provide an indication that the person carrying the receiver has been hit by the laser. It is possible, however, for a user to simulate the firing of a blank cartridge in some systems without actually firing a blank by manipulating the rifle to "re-coil" such that the laser simulation system transmitter is operated. Thus, the laser shot from that transmitter can go unrecognized, giving the user an unfair advantage.

To overcome these problems, the present invention provides a laser simulation system transmitter that is triggered in response to the heat and/or pressure generated by the blank ammunition gasses upon firing. This provides a way to ensure that the transmitter is only initiated when the user actually pulls the trigger (not shown). Still referring to FIGS. 7 and 8, the sight block 440 may be used to provide a port 473 through which a heat sensor 474 may be inserted into the rifle barrel. The heat sensor 474 passes through the port 473 to provide a signal to the apparatus 410 responsive to the heat of combustion when a blank munition is fired in the rifle, for purposes discussed below. The hot combustion gasses flow through a passage 475 in the barrel 470, to a passage 476 in the block 440. The port 473 opens to the passage 476. The heat sensor signal may be used to prevent the user from manipulating the laser simulation system.

As shown in FIG. 4, the body 420 may also have right and left casings 422, 423 for receiving electronic and optical components for use in the multi-laser apparatus. Cavities or chambers 462, 463 (FIG. 6) are formed in the right and left casings 422, 423. Components may also be located in a body cavity or chamber 460. The body cavity 460 may also be used to contain components that connect the components in the side cavities or chambers 462, 463. The front portions of the body cavity 460 are enclosed by right, left and center casing portions 422, 423, 425. The center casing portion 424 fits into a casing slot 415 located in the cover 412. The casings 422, 423 may be arranged to straddle or wrap at least partially around the sight block 440 and/or the rifle barrel 470. Thus, the assembly 410 may have a saddle-shaped construction.

Figure 5:
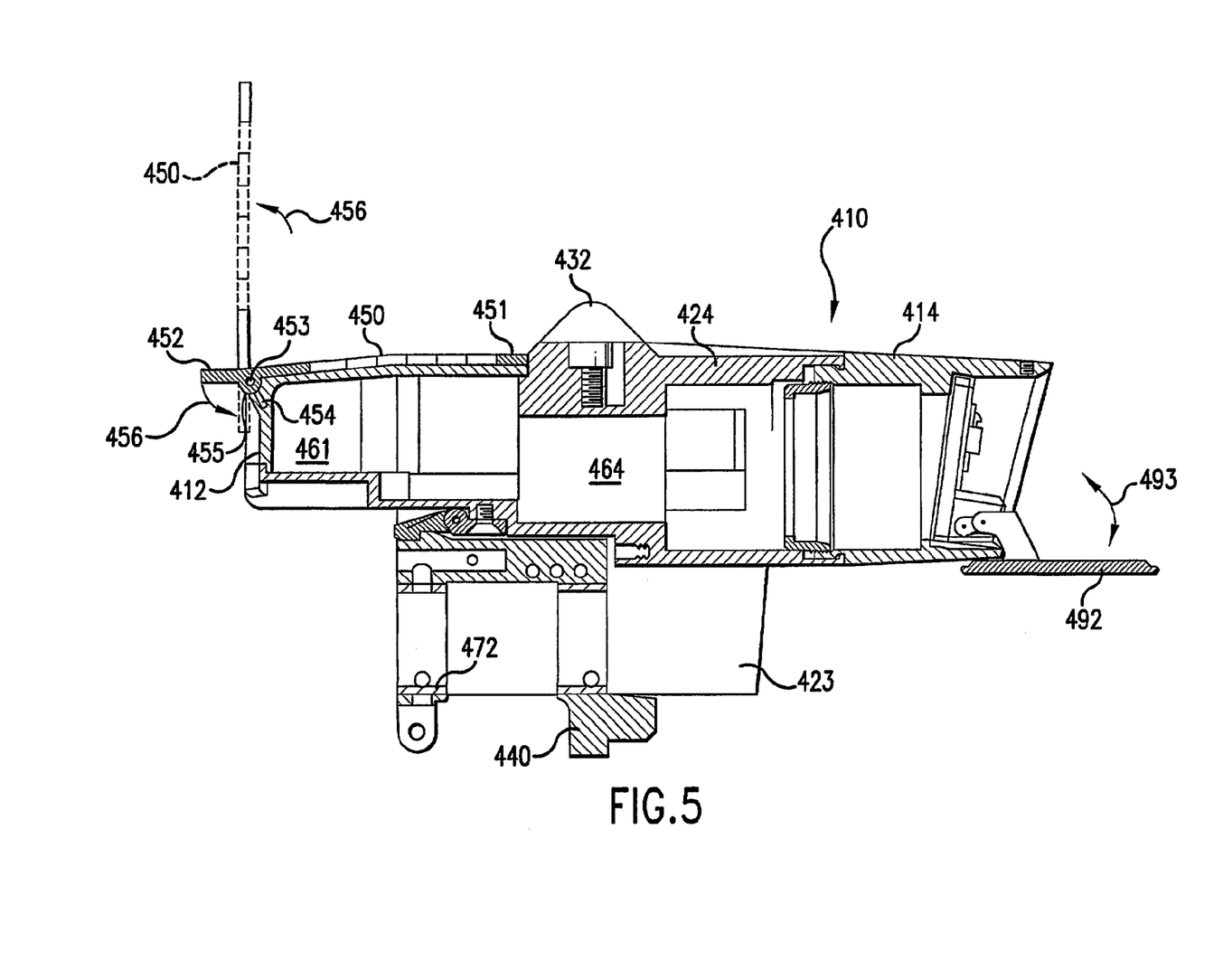
FIG. 5 is a cross sectional view of the optical assembly of FIG. 4.

Referring now to FIG. 5, there is shown a gum sight 450 that can be flipped up from the cover 412. The flipped-up position is shown in phantom lines in FIG. 5. The retracted position for when the sight is not being used is shown in solid lines in FIG. 5. The sight 450 may be hinged to the cover 412 by a suitable hinge mechanism 452, 453, 454, 455. The hinge mechanism may include a lever 452, a pin 453, and a number of detents 454 for receiving the lever 452 which may be opened or closed in the direction of arrows 456. The pin 453 may be located in a housing portion 455.

If desired, the apparatus 410 may be provided with a suitable hinged lens cap 492 for preventing dirt or water from reaching the lens system discussed in more detail below.

Referring now to FIG. 6 there is shown one arrangement by which the optical and electrical components of the apparatus are located within the body 420. As shown, the optical guide enclosure 484 is located longitudinally within the central cavity 460. The enclosure 484 has an enlarged end 485 that receives a triple lens system 490. The lens cover 492 is located on the front of the body 420 to protect the lens triplet 490. The back end of the enclosure 490 receives a fiber input/output device or connector 494. The enclosure 484 diverges by an amount approximately equal to the angle of divergence from the optical fiber at the input/output device 494.

The fiber input/output device 494 receives optical signals and inputs return signals into a multiplexer in a manner described above in connection with FIGS. 1-3. The input signals are generated by three or more laser sources. The laser sources 500, 502 are located within the cavity 460, 462, 463 and are connected to the input/output device 494 by suitable optical fibers 504, 506, 508 and optical components. All of the optical fibers, components and sources may be located within the same cavity 460, 462, 463.

The laser sources 500, 502 and other electrical and optical components and fibers 504, 508 may be assembled on suitable circuit boards 510, 512. The circuit boards 510, 512 are located in the right and left chambers 462, 463. The components 500, 502 may be assembled on the boards 510, 512 before the boards 510, 512 are located in the chambers 462, 463. Output fibers 504, 508 from the laser sources 500, 502 are coupled to the input/output fiber 506 through a multiplexer and other components as described in the above-mentioned pending application filed concurrently herewith. If desired, an additional circuit board may be located in the center chamber 461.

A suitable digital compass may be provided on or in the body 420 to provide the user with azimuth and positional location data. Such devices are known per se. The present invention may be used to integrate them within a compact rugged package 420, 440 for use with other functional devices.

If desired, an infrared illuminator lens 491 (FIG. 6) may be provided adjacent the optical guide enclosure 484. The lens 491 may be connected to an input fiber 591. Infrared energy may be supplied to the fiber 591 in the manner described above in connection with FIGS. 1-3. By providing the lens 491 in the same package as the lens system 490, a wide variety of optical functional devices may be supplied in a relatively compact package.

Reference has been made to preferred embodiments in describing the invention. However, additions, deletions, substitutions, or other modifications which would fall within the scope of the invention defined in the claims may be implemented by those skilled in the art without departing from the spirit or scope of the invention. For example, the invention is not limited for use with rifles. The invention may also be used with other aimable devices, such as binoculars. Accordingly, the invention is not to be considered as limited by the foregoing description, but is only limited by the scope of the appended claims.

The entire disclosures of U.S. patent application Ser. No. 09/549,497, filed Apr. 14, 2000 and U.S. Provisional Patent Application No. 60/197,777, filed Apr. 14, 2000, are expressly incorporated herein by reference.

What is claimed as new and desired to be protected by Letters Patent of the United States is:

1. An optical system, comprising:
   a source for inputing a first input energy which has a first wavelength; and
   a component for multiplexing said first input energy with a second input energy having a second wavelength, and for directing said first input energy toward first and second output components for two or more different uses, wherein at least one of said output components is selected from the group consisting of a laser range finder, an infrared aimlight system, an infrared illumination system, a visible aimlight system, and a multiple integrated laser engagement system.

2. The system of claim 1 wherein at least one of said output components comprises a laser range finder.

3. The system of claim 1 wherein at least one of said output components comprises an infrared aim light system.

4. The system of claim 1 wherein at least one of said output components comprises an infrared illumination system.

5. The system of claim 1 wherein at least one of said output components comprises a visible aim light system.

6. The system of claim 1 wherein at least one of said output components comprises a multiple integrated laser engagement system.

7. The system of claim 6 wherein the transmission wavelength of said multiple integrated laser engagement system is in the near infrared spectrum.

8. The system of claim 7 wherein the transmission wavelength is about 820 nm to about 860 nm.

9. The system of claim 1, further comprising a dual lens configuration for transmitting multifunction light beams.

10. The system of claim 1 further comprising a pump laser optically connected to a fiber amplifier for exciting ions to cause the transmission of said input energy.

11. The system of claim 10 wherein said pump laser is connected to the side of said fiber amplifier.

12. The system of claim 1 further comprising a photodetector for detecting received light signals.

13. They system of claim 1 further comprising a sensor for sensing the firing of a blank round.

14. A method of operating a multi-function optical system, comprising the steps of:
   using a first laser diode to generate first laser energy having a first wavelength;
   using a second laser diode to generate second laser energy having a second wavelength;
   multiplexing said first and second laser energies; and
   subsequently, directing said first laser energy toward first and second output lenses to form light beams for two or more different purposes, wherein at least one of said purposes is selected from the group consisting of a laser range finder, an infrared aimlight system, an infrared illumination system, a visible aimlight system, and a multiple integrated laser engagement system.

* * * * *